United States Patent Office 2,799,712
Patented July 16, 1957

2,799,712
FLUOROVINYL ETHERS

Louise Speers Croix, Summit, and Alio J. Buselli, New Providence, N. J., assignors to Air Reduction Company, Incorporated, New York, N. Y., a corporation of New York No Drawing. Application October 26, 1954,
Serial No. 464,891

16 Claims. (Cl. 260—612)

This invention relates to a method for the preparation of fluorovinyl ethers and includes a novel class of chemical products.

Vinyl ethers have been prepared heretofore by the reaction of vinyl chloride with alcohol in the presence of an alkali catalyst. Such reactions have been known to proceed readily and to give the desired unsaturated ether product directly in substantially good yield. However, when these methods are applied to polyfluoro olefins for the purpose of preparing vinyl ethers containing fluorine in the vinyl group, this type of reaction does not proceed in the same manner and it has been found that saturated ethers result instead. The saturated ethers may frequently be dehydrohalogenated to give a fluorovinyl ether product, but this is not entirely satisfactory since a further treatment is then involved. In addition, the yields obtained are extremely small in many instances.

It is an object of the present invention to utilize polyfluoroethylenes in the preparation of fluorovinyl ethers in which the desired unsaturated ether products are obtained directly in substantially good yields without the occurrence of intermediate saturated fluoro ethers. It is a further object of the invention to prepare a class of novel fluorovinyl organic ethers having many novel and useful properties. Other objects will appear hereinafter.

According to the invention, fluorovinyl organic ethers are prepared by reacting a polyfluoroethylene with an alkali metal alcoholate, having the structural formula ROM, where R is an organic radical such as alkyl, fluoroalkyl or phenyl and M is an alkali metal, in an inert, organic solvent while maintaining substantially anhydrous conditions. The product may be separated from the reaction mixture by fractional distillation.

The polyfluoroethylenes which are preferably used in the practice of the present method may be represented by the structural formula: $CF_2=CXX'$, where X and X' are selected from the group consisting of H, F, and Cl. The polyfluoroethylene compounds which are most preferred are asymmetrical with respect to the positioning of the fluorine atoms, and are more reactive for the purposes of the present invention. Examples of the polyfluoroethylene compounds, which may be used are: 1,1-difluoro-2,2-dichloroethylene; 1,1,2-trifluoro-2-chloroethylene; 1,1-difluoro-2-chloroethylene; 1,1-difluoroethylene; and 1,1,2,2-tetrafluoroethylene. The alkali metal alcoholates which are preferred are the alkali metal salts of ethanol, 2,2,2-trifluoroethanol and phenol; for example, potassium ethanolate, potassium 2,2,2-trifluoroethanolate and potassium phenate.

The present reaction involves the displacement of one of the fluorine atoms of the polyfluoroethylene by the alcoholate ion of the alkali metal alcoholate, thus forming, directly, the desired fluorovinyl organic ether and an insoluble alkali metal fluoride. The reaction, utilizing the preferred materials given above, may be illustrated by the following equation:

$$ROM + CF_2=CXX' \rightarrow ROCF=CXX' + MF$$

where R is an organic radical selected from the group consisting of ethyl, 2,2,2-trifluoroethyl and phenyl;
M is an alkali metal; and X and X' are selected from the group consisting of H, F and Cl.

The reaction is carried out, as described herein, in an inert, organic solvent under substantially anhydrous conditions. The insoluble alkali metal fluorides are preferably removed by filtration after which the desired fluorovinyl organic ether product is readily separated from the filtrate by fractional distillation. It will be seen, according to the equation given above for the present reaction, that the vinyl group loses one fluorine atom in the reaction. Therefore, in order to obtain a particular fluorovinyl group in the vinyl ether product, a polyfluoroethylene must be selected which contains one additional fluorine. For example, an ether having a fluorovinyl group as shown in the structural formula $ROCF=CFCl$ is prepared by utilizing the polyfluoroethylene having the structural formula $CF_2=CFCl$; and an ether having a fluorovinyl group shown by the structural formula $ROCF=CH_2$ is prepared by utilizing the polyfluoroethylene having the structural formula $CF_2=CH_2$.

The solvents employed in the practice of the present method should preferably be slightly polar, dry, organic solvents which are inert with respect to the reactants and the products formed therefrom. These solvents are substances which afford sufficient solubility therein of the metal alcoholates and the fluoro olefins used, for the purposes of the invention. Examples of such solvents are aromatic solvents such as benzene, toluene and xylene; cyclic ethers such as dioxan and tetrahydrofuran; and, higher boiling aliphatic ethers; such as diisopropyl ether and dibutyl ether. The preferred solvents are benzene, toluene and xylene.

It is essential to the present reaction that "anhydrous conditions" be maintained. By this term is meant the exclusion of water or moisture from the reaction. It is believed that when even small amounts of moisture are present, alcohol is generated from the metal alcoholate used in the reaction, as a result of which addition occurs across the double bond of the fluorovinyl group in preference to the desired displacement of the fluorine attached to the unsaturated bond, thus greatly interfering with the mechanism of the reaction. Alcohol itself is excluded by obtaining the metal alcoholate, used in the reaction, free of the alcohol from which it is prepared. The essential anhydrous conditions may be created by first obtaining the reactants in substantially dry state preparatory to the reaction, and thereafter by avoiding the acquisition of atmospheric or other moisture during the course of the reaction. Thus, for example, the alcoholates used in the present method are preferably prepared by drying the corresponding alcohol from which they are obtained with a suitable drying agent after which the dried alcohol is reacted with the desired alkali metal. The dry alcoholate is then obtained free of the alcohol by distillation of the alcohol solution in the presence of the dry, inert, solvent. The solvents used in the reaction are also first dried, for example, such as by azeotropic distillation; and the polyfluoroethylene reactants are also first dried, for example, by treatment with a drying agent such as calcium sulphate or calcium chloride. When the reaction is carried out at supra-atmospheric pressure, the reactants, previously dried as above, are sealed in a bomb and the possibility of acquiring detrimental amounts of moisture from outside sources is thereby avoided. When the reaction is carried out at atmospheric pressure, the reactants may be placed in, or delivered to, a suitable reaction vessel having adequate means for excluding atmospheric moisture. For example, a conventional drying tube device may be inserted in the inlet tube or dropping funnel through which the reactants are delivered to the reaction vessel, and such a device may also be disposed in the condenser to the atmosphere, if this is used. These various modes of operation, it is believed, will be readily understood to one skilled in the art, and will enable adequate provision to be made for the exclusion of moisture from the reaction as required for the successful performance of the present method.

The temperature and pressure at which the reaction is carried out may vary over a wide range, depending upon the nature of the reactants. Generally, the lower boiling polyfluoroöelfins appear to be less reactive and the reaction of these materials is facilitated by the provision of higher temperatures and supra-atmospheric pressures. Temperatures of from (minus) —20° C. to (plus) +150° C. are suitable for carrying out the present reaction, using the preferred agents. Similarly, pressures of from atmospheric to about 300 p. s. i. may be used.

New reaction products are obtained by reacting the alkali metal alcoholate of 2,2,2-trifluoroethanol, and a polyfluoroethylene, according to the present method. These products are polyfluoroethyl fluorovinyl ethers containing one or more fluorine atoms attached to the vinyl group and three fluorine atoms attached to the beta-carbon of the ethyl group. The new class of compounds may be represented by the structural formula:

$$CF_3CH_2OCF{=}CXX'$$

where X is selected from the group consisting of H, F, and, Cl; and, X' is selected from the group consisting of H and Cl. In the new compounds the alpha-carbon of the trifluoroethyl group has been found to exhibit increased chemical reactivity. The novel compounds are useful in organic synthesis. The new 2,2,2-trifluoroethyl fluorovinyl ethers may also be used as solvents and some of them possess sufficient potency for use as anesthetic agents. In addition, the novel ethers are monomeric materials which can be used to form highly fluorinated polymers that are thermally stable, resistant to solvents, and useful as adhesives, coatings, etc.

The invention is further illustrated by the following examples:

*Example I.*—*Preparation of 2,2,2-trifluoroethyl 1'-fluoro-2'-chlorovinyl ether*

A quantity of trifluoroethanol was first dried with phosphorous pentoxide. Potassium trifluoroethanolate (0.5 mole) was prepared by dissolving 20 g. of potassium in 100 ml. trifluoroethanol, dried as above, and 200 ml. of dry ethyl ether, in a 1 liter, three neck flask equipped with a condenser having a drying tube at its outer terminal end, a dropping funnel, and a stirrer. The excess alcohol was removed by distillation. 300 ml. of toluene, previously dried by azeotropic distillation, was added and further distilled until the boiling point of toluene was reached, 110° C. The toluene mixture was cooled to —10° C. and 0.66 mole of 1,1-difluoro-2-chloroethylene passed through a drying tube of calcium sulphate and condensed into the mixture, which was then loaded into a stainless steel Aminco rocking bomb. The sealed bomb was heated at 110° C. for 10 hours. The resulting toluene suspension was filtered free of the neutral inorganic salts, dried, and distilled to yield two fractions. The main fraction, in 50 percent yield, was identified as 2,2,2-trifluoroethyl 1'-fluoro-2'-chlorovinyl ether, B. P. 84° C.; $n_D^{20}$ 1.3426.

*Analysis.*—Calcd. for $C_4H_3OF_4Cl$: C, 26.91; H, 1.69; F, 42.58. Found: C, 26.74; H, 1.92; F, 42.76.

The reaction was carried out at atmospheric pressure as follows: 0.6 mole of potassium trifluoroethanolate was prepared as described above, and heated with 600 ml. of dry toluene to remove the excess trifluoroethanol. The mixture was cooled at —10° C. and 77g. of 1,1-difluoro-2-chloroethylene was passed through a drying tube charged with calcium sulphate and bubbled into the mixture over a period of four hours. The solid, identified as potassium fluoride, was removed by filtration and the toluene filtrate was then fractionated to yield 46 g. of 2,2,2-trifluoroethyl 1'-fluoro-2'-chlorovinyl ether.

*Example II.*—*Preparation of ethyl 1-fluoro-2,2-dichlorovinyl ether*

Using the same apparatus as described above in connection with Example I, sodium ethanolate was prepared from 19 g. of sodium dissolved in an excess of absolute ethanol which was first dried by treatment with sodium and diethyl phthalate. 400 ml. of dry xylene was added to the sodium ethanolate and the mixture distilled until the vapors reached 120° C. The mixture in the form of a slurry was loaded into a rocking bomb which was then cooled to 0° C. 131 g. of 1,1-difluoro-2,2-dichloroethylene was passed through a drying tube and condensed into the xylene mixture. The bomb was then heated at 100–125° C., at pressures of 12–25 p. s. i., for twelve hours. The bomb was then cooled, emptied of its contents, and the mixture filtered to remove the unsoluble salts. The xylene filtrate was distilled to yield 38 g. of ethyl 1-fluoro-2,2-dichlorovinyl ether; B. P. 121° C.; $n_D^{20}$ 1.4202.

*Analysis.*—Calcd. for $C_4H_5OFCl_2$: C, 30.21; H, 3.17; Cl, 44.60. Found: C, 29.94; H, 3.26; Cl, 43.97.

The reaction was carried out at atmospheric pressure as follows: 0.5 mole potassium ethanolate prepared in the same manner as the sodium ethanolate described above, was heated with dry xylene to remove the excess ethanol. While stirring at room temperature, 78 g. of 1,1-difluoro-2,2-dichloroethylene was passed through a drying tube and bubbled into the flask over a period of three hours. A temperature rise to about 47° C. occurred. The precipitated inorganic salts were filtered and the clear xylene filtrate fractionated to yield 28 g. of ethyl 1-fluoro-2,2-dichlorovinyl ether.

*Example III.*—*Preparation of 2,2,2-trifluoroethyl 1'-fluoro-2',2'-dichlorovinyl ether*

In a flask equipped as described in Example I, 31.2 g. of potassium was dissolved slowly in a solution of 100 g. of dry trifluoroethanol and 200 ml. of ethyl ether. The ethyl ether was distilled off and 400 ml. of dry toluene added and distilled until the excess trifluoroethanol was removed and the B. P. of toluene reached. The cooled slurry was poured into a rocking bomb which was then cooled to —20° C., to allow 123 g. of 1,1-difluoro-2,2-dichloroethylene to be condensed therein; the vapors being delivered through a drying tube charged with calcium sulphate. The sealed bomb was heated at a temperature of between 115 to 140° C. and at a pressure of from 9 to 28 p. s. i. for 28 hours. The resulting toluene suspension was filtered and distilled to yield 10 g. of 2,2,2-trifluoroethyl 1'-fluoro-2',2'-dichlorovinyl ether, B. P. 154° C., $n_D^{20}$ 1.3605.

*Analysis.*—Calcd. for $C_4H_2OF_4Cl_2$: C, 22.55; H, 0.95; F, 35.60. Found: C, 23.67; H, 1.65; F, 35.58.

*Example IV.*—*2,2,2-trifluoroethyl 1',2'-difluoro-2'-chlorovinyl ether*

0.8 mole of potassium trifluoroethanolate was prepared as described above in Example I, and heated with toluene to remove the excess alcohol. The mixture was placed in a rocking bomb and cooled to (minus) 50° C. to admit 123 g. of 1,1,2-trifluoro-2-chloroethylene which was previously passed through a drying tube. The bomb was sealed and heated to a temperature of between 100 to 120° C., at pressures of 100 to 120 p. s. i., for twelve hours. The clear toluene filtrate obtained after removal of the insoluble salts was fractionated to yield 34 g. of 2,2,2-trifluoroethyl 1',2'-difluoro-2'-chlorovinyl ether, B. P. 75° C., $n_D^{20}$ 1.3253. In addition, 50 g. of an isomeric cyclic compound having a B. P. of 80° C. and $n_D^{20}$ 1.3108 was obtained.

*Analysis.*—Calcd. for $C_4H_2OF_5Cl$: C, 24.44; H, 1.03. Found: C, 24.35; H, 1.35.

The reaction was carried out at atmospheric pressure as follows:

A mixture of 0.5 mole of potassium trifluoroethanolate in toluene which was prepared as above, was cooled to −10° C. An excess of 1,1,2-trifluoro-2-chloroethylene was passed through a drying tube and bubbled through the mixture, over a period of three hours, until an equivalent amount was absorbed. A very thick slurry was formed which was centrifuged. The clear toluene solution obtained therefrom was fractionated to yield 44 g. of 2,2,2-trifluoroethyl 1′,2′-difluoro-2′-chlorovinyl ether. In addition, 29 g. of the isomeric cyclic compound was also obtained.

*Example V.—Preparation of ethyl 1,2-difluoro-2-chlorovinyl ether*

A solution of 0.8 mole of sodium ethanolate in toluene was prepared as described in Example II. The solution was then placed in a rocking bomb and 119 g. of 1,1,2-trifluoro-2-chloroethylene was passed through a drying tube and added to the solution. The sealed bomb was heated at a temperature from 100 to 135° C., 75–100 p. s. i., for twelve hours. The inorganic salts were filtered off and the filtrate fractionated to yield 58 g. of ethyl 1,2-difluoro-2-chlorovinyl ether, B. P. 80.5° C., $n_D^{20}$ 1.3701.

*Analysis.*—Calcd. for $C_4H_5OF_2Cl$: C, 33.72; H, 3.54; F, 26.66. Found: C, 33.63; H, 3.66; F, 26.64.

The reaction was carried out at atmospheric pressure as follows:

A stream of 1,1,2-trifluoro-2-chloroethylene was passed through a drying tube and bubbled through a dry suspension of 0.5 mole of potassium ethanolate in toluene which was cooled to 0–10° C. The addition of the 1,1,2-trifluoro-2-chloroethylene was continued at a slow rate for about three hours until an equivalent amount was absorbed. The temperature of the reaction mixture then rose to 25° C. The resulting thick suspension was centrifuged and the clear supernatant decanted and distilled to give 58 g. of ethyl 1,2-difluoro-2-chlorovinyl ether.

*Example VI.—Preparation of 2,2,2-trifluoroethyl 1′-fluorovinyl ether*

One mole of sodium trifluoroethanolate was prepared as described in Example I, by dissolving small portions of sodium in 250 g. of trifluoroethanol and 100 ml. of ethyl ether. Dry toluene was added and the low boiling materials removed up to 108° C. The cooled suspension was loaded into a rocking bomb, sealed and heated to 80° C. A cylinder of 1,1-difluoroethylene was attached and the vapors led from the cylinder until the pressure reached 250 p. s. i. As the reaction proceeded, gas was added to maintain the pressure of the bomb at 250 p. s. i. The bomb was cooled after 24 hours, opened, and the insoluble potassium fluoride filtered off from the reaction mixture. The filtrate yielded 42 g. of 2,2,2-trifluoroethyl 1′-fluorovinyl ether, B. P. 43° C., $n_D^{20}$ 1.298.

*Analysis.*—Calcd. for $C_4H_4OF_4$: C, 33.34; H, 2.80; F, 52.78. Found: C, 32.60; H, 3.03; F, 52.80.

*Example VII.—Preparation of ethyl 1-fluoro-2-chlorovinyl ether*

0.8 mole of potassium ethanolate was prepared from anhydrous ethanol as described in Example II, and was heated with toluene to remove the excess alcohol. The toluene mixture was added to a rocking bomb with 70 g. of dry 1,1-difluoro-2-chloroethylene and heated at 100 to 110° C. and 20 to 30 p. s. i. pressure for twelve hours. The thick suspension obtained was centrifuged and the clear supernatant decanted and distilled to yield 54 g. of ethyl 1-fluoro-2-chlorovinyl ether, B. P. 89° C., $n_D^{20}$ 1.3944.

*Analysis.*—Calcd. for $C_4H_6OFCl$: C, 38.58; H, 4.86. Found: C, 38.74; H, 5.12.

*Example VIII.—Preparation of phenyl 1-fluoro-2,2-dichlorovinyl ether*

Potassium phenoxide was prepared by treating an aqueous solution of 94 g. of phenol with a stoichiometric quantity of potassium hydroxide. The water was removed by distillation and toluene was added to azeotrope out the last remaining traces. The dry toluene suspension was placed in a rocking bomb and 240 g. of 1,1-difluoro-2,2-dichloroethylene passed through a drying tube and added to the suspension. The bomb was sealed and heated for 12 hours at a temperature of between 90 and 100° C. and at a pressure of from 20 to 30 p. s. i. The resulting mixture was centrifuged and the supernatant distilled. After removing the toluene, the residue was vacuum distilled to yield 129 g. of phenyl 1-fluoro-2,2-dichlorovinyl ether, B. P. 121° C./55 mm., $n_D^{20}$ 1.5114.

*Analysis.*—Calcd. for $C_8H_5OFCl_2$: Cl, 34.25. Found: Cl, 34.54.

We claim:

1. The method of preparing fluorovinyl ethers comprising reacting a polyfluoroethylene with an alkali metal alcoholate, in the absence of substances containing a functional hydroxyl group and under substantially anhydrous conditions, in an inert, organic solvent, and removing the corresponding fluorovinyl ether product from the reaction mixture.

2. The method of preparing fluorovinyl ethers comprising reacting a 1,1-polyfluoroethylene having the structural formula $CF_2=CXX'$, wherein X and X′ are selected from the group consisting of H, F and Cl, with an alkali metal alcoholate, under substantially anhydrous conditions, in an inert, organic solvent, and removing the corresponding fluorovinyl ether product from the reaction mixture.

3. The method of preparing fluorovinyl ethers comprising reacting a 1,1-polyfluoroethylene, having the structural formula, $CF_2=CXX'$, wherein X and X′ are selected from the group consisting of H, F and Cl, with an alkali metal alcoholate having the structural formula ROM, in which R is a radical, selected from the group consisting of alkyl, fluoroalkyl and phenyl, and M is an alkali metal, under substantially anhydrous conditions, in an inert, organic solvent, and removing the corresponding fluorovinyl ether product from the reaction mixture.

4. The method according to claim 3 wherein said inert, organic solvent is selected from the group consisting of benzene, toluene and xylene.

5. The method according to claim 3 wherein said alcoholate comprises an alkali metal ethanolate.

6. The method according to claim 3 wherein said alcoholate comprises an alkali metal phenate.

7. The method according to claim 2 wherein said polyfluoroethylene comprises 1,1-difluoro-2,2-dichloroethylene.

8. The method according to claim 2 where said polyfluoroethylene comprises 1,1,2-trifluoro-2-chloroethylene.

9. The method according to claim 2 wherein said polyfluoroethylene comprises 1,1-difluoro-2-chloroethylene.

10. The method according to claim 2 wherein said polyfluoroethylene comprises 1,1-difluoroethylene.

11. The method of preparing fluorovinyl ethers comprising reacting a 1,1-polyfluoroethylene, having the structural formula, $CF_2=CXX'$, wherein X and X′ are selected from the group consisting of H, F and Cl, with an alkali metal 2,2,2-trifluoroethanolate, under substantially anhydrous conditions, in an inert, organic solvent, and removing the corresponding fluorovinyl ether produce from the reaction mixture.

12. A fluorovinyl ether having the formula $$CF_3CH_2OCF=CXX'$$

where X is selected from the group consisting of H, F and Cl, and X' is selected from from the group consisting of H and Cl.

13. 2,2,2-trifluoroethyl 1'-fluoro-2'-chlorovinyl ether.
14. 2,2,2-trifluoroethyl 1'-fluoro-2',2'-dichlorovinyl ether.
15. 2,2,2-trifluoroethyl 1',2'-difluoro-2'-chlorovinyl ether.
16. 2,2,2-trifluoroethyl 1'-fluorovinyl ether.

References Cited in the file of this patent
UNITED STATES PATENTS 2,671,799  Miller _____ Mar. 9, 1954